(12) United States Patent
Liu et al.

(10) Patent No.: US 11,370,119 B2
(45) Date of Patent: Jun. 28, 2022

(54) DISTRIBUTED CONGESTION CONTROL METHOD AND ROBOT

(71) Applicant: SYRIUS ROBOTICS CO., LTD., Shenzhen (CN)

(72) Inventors: Junbin Liu, Shenzhen (CN); Xingyuan Mu, Shenzhen (CN)

(73) Assignee: SYRIUS ROBOTICS CO., LTD., Shenzhen (CN)

(*) Notice: Subject to any disclaimer, the term of this patent is extended or adjusted under 35 U.S.C. 154(b) by 0 days.

(21) Appl. No.: 17/529,301

(22) Filed: Nov. 18, 2021

(65) Prior Publication Data

US 2022/0161434 A1    May 26, 2022

(30) Foreign Application Priority Data

Nov. 23, 2020   (CN) .......................... 202011319788.4

(51) Int. Cl.
*B25J 9/16* (2006.01)

(52) U.S. Cl.
CPC .......... *B25J 9/1682* (2013.01); *B25J 9/1653* (2013.01); *B25J 9/1666* (2013.01)

(58) Field of Classification Search
CPC ...... B25J 9/1682; B25J 9/1653; B25J 9/1666; B25J 9/1676
See application file for complete search history.

(56) References Cited

U.S. PATENT DOCUMENTS

| 2019/0310656 A1 | 10/2019 | Suzuki et al. |
| 2020/0089237 A1* | 3/2020 | Whitaker ............. G01C 21/206 |

FOREIGN PATENT DOCUMENTS

| CN | 105488892 A | 4/2016 |
| CN | 109279252 A | 1/2019 |
| CN | 109343524 A | 2/2019 |

* cited by examiner

*Primary Examiner* — Basil T. Jos
(74) *Attorney, Agent, or Firm* — Gang Yu (57) ABSTRACT

The present disclosure provides a distributed congestion control method and a robot. The method includes: disposing a first area and a second area centered on a target point; detecting, when a first robot moves towards the target point, whether there are other robots in the second area or not, and in a case where there are other robots in the second area, coordinating the first robot and the other robots to determine a second robot allowed to simultaneously enter the first area; and controlling the second robot to move towards the target point in a case where the second robot has entered the first area.

17 Claims, 5 Drawing Sheets

DISTRIBUTED CONGESTION CONTROL METHOD AND ROBOT

CROSS REFERENCE

This application claims priority to Chinese Application No. 202011319788.4 filed on Nov. 23, 2020 with China National Intellectual Property Administration, the entirety of which is herein incorporated by reference.

TECHNICAL FIELD

The present disclosure relates to the field of mobile communication, and in particular relates to a distributed congestion control method and a robot.

BACKGROUND

In a related art, with the continuous development of robot technologies, robots play a more and more important role in the field of storage. In the working process of storage robots, a large number of robots are often required to cooperate to complete a task. For example, in a warehouse where mobile robots are used for picking, hundreds or even thousands of robots may cooperate with each other to complete a commodity picking task. In the process that a large number of robots cooperate in the same environment, when a plurality of mobile robots have the same target point and go to the same picking area, or a plurality of mobile robots go to a packing table at the same time, robot congestion often occurs. When robot congestion occurs, the risk of robot collision may be greatly increased. At the same time, the slow movement of the robots may greatly affect the efficiency of commodity picking. Therefore, congestion management is very necessary in a multi-machine system where a large number of robots cooperate with each other.

In the related art, the congestion problem is generally solved by centralized control, that is, a central server is used for calculating an optimal moving trajectory for each robot in a robot group, so as to reduce the risk of robot congestion. However, the above processing scheme has obvious disadvantages: on one hand, the scheme relies heavily on the central server, and when the central server fails, the whole system may be paralyzed; on the other hand, with the increase of the number of robots, the computing pressure of the central server may be greater and greater, and the production cost may be higher and higher.

SUMMARY

The embodiments of the present disclosure provide a distributed congestion control method, which includes the following operations.

A first area and a second area are disposed centered on a target point. The first area is included in the second area.

When a first robot moves towards the target point, whether there are other robots in the second area or not is detected. In a case where there are other robots in the second area, the first robot and the other robots are coordinated to determine a second robot allowed to simultaneously enter the first area.

The second robot is controlled to move towards the target point in a case where the second robot has entered the first area.

In at least one exemplary embodiment, before the operation that the first area and the second area are disposed centered on the target point, wherein the first area is included in the second area, the method may include the following operations.

Each robot independently maintains a state machine.

A normal state, a suspended state, a locked state and a continue state of the robot are determined by the state machine.

In at least one exemplary embodiment, the operation that whether there are other robots in the second area or not is detected when the first robot moves towards the target point, and in a case where there are other robots in the second area, the first robot and the other robots are coordinated to determine the second robot allowed to simultaneously enter the first area includes the following operations.

When the first robot moves towards the target point, it is determined that the first robot is in the normal state.

When the first robot enters the second area, whether there are other robots in the second area or not is detected.

In at least one exemplary embodiment, the operation that whether there are other robots in the second area or not is detected when the first robot moves towards the target point, and in a case where there are other robots in the second area, the first robot and the other robots are coordinated to determine the second robot allowed to simultaneously enter the first area further includes the following operations.

In the case where there are other robots in the second area, whether target points of the other robots are the same as the target point of the first robot or not is detected.

In a case where the target points of the other robots are the same as the target point of the first robot, the first robot is switched from the normal state to the suspended state.

In at least one exemplary embodiment, the operation that whether there are other robots in the second area or not is detected when the first robot moves towards the target point, and in a case where there are other robots in the second area, the first robot and the other robots are coordinated to determine the second robot allowed to simultaneously enter the first area further includes the following operations.

A third area corresponding to the first robot is determined centered on the first robot.

The first robot is controlled to perform obstacle avoidance movement in the third area.

In at least one exemplary embodiment, the operation that whether there are other robots in the second area or not is detected when the first robot moves towards the target point, and in a case where there are other robots in the second area, the first robot and the other robots are coordinated to determine the second robot allowed to simultaneously enter the first area further includes the following operations.

Whether a state of the first robot is able to be changed or not is detected according to a preset detection cycle.

A first probability of keeping the suspended state is determined, and a second probability of switching from the suspended state to the continue state is determined.

In at least one exemplary embodiment, the operation that whether there are other robots in the second area or not is detected when the first robot moves towards the target point, and in a case where there are other robots in the second area, the first robot and the other robots are coordinated to determine the second robot allowed to simultaneously enter the first area further includes the following operations.

The first robot is controlled to move towards the target point in a case where the first robot is switched from the suspended state to the continue state.

The first robot is switched from the continue state to the normal state when the first robot reaches the target point.

In at least one exemplary embodiment, after the operation that whether there are other robots in the second area or not is detected when the first robot moves towards the target point, and in a case where there are other robots in the second area, the first robot and the other robots are coordinated to determine the second robot allowed to simultaneously enter the first area, the method may include the following operations.

The second robot is switched from the normal state to the locked state in a case where the second robot in the normal state is outside the second area and a robot in the suspended state or the locked state is detected.

The second robot in the locked state is controlled to perform obstacle avoidance movement in the third area, and the second robot is switched from the locked state to the suspended state when the second robot reaches the second area during the obstacle avoidance movement.

The second robot is switched from the normal state to the locked state in a case where the second robot is outside the second area and a robot in the suspended state or the locked state is not detected.

The embodiments of the present disclosure also provide a robot. The robot is capable of performing autonomous obstacle avoidance control among a plurality of robots. The robot is configured to perform moving tasks under distributed congestion control. The robot includes a mobile base, a sensing assembly and a processor.

The mobile base is configured to drive a robot to independently navigate to a target point of a task to be executed.

The sensing assembly determines whether there are other robots in an adjacent area of the robot or not through distance detection.

The processor is configured to perform distributed congestion control to control the robot to reach the target point;

dispose a first area and a second area centered on the target point, wherein the first area is included in the second area;

detect, when a first robot moves towards the target point, whether there are other robots in the second area or not, and in a case where there are other robots in the second area, coordinate the first robot and the other robots to determine a second robot allowed to simultaneously enter the first area; and control the second robot to move towards the target point in a case where the second robot has entered the first area.

The embodiments of the present disclosure also provide a computer-readable storage medium. A distributed congestion control program is stored on the computer-readable storage medium. When the distributed congestion control program is executed by a processor, the operations of the distributed congestion control method as described in any one of the above embodiments are performed.

By implementation of the distributed congestion control method and the robot in the embodiments of the present disclosure, the first area and the second area are disposed centered on the target point, wherein the first area is included in the second area; when the first robot moves towards the target point, whether there are other robots in the second area or not is detected, and in a case where there are other robots in the second area, the first robot and the other robots are coordinated to determine the second robot allowed to simultaneously enter the first area; and the second robot is controlled to move towards the target point in a case where the second robot has entered the first area. A more efficient distributed congestion control scheme is implemented, so that the robot can independently perform anti-congestion control according to the position of the robot and the states of adjacent robots in the process of task execution, the problems of system instability and relatively high resource occupation caused by centralized congestion control are avoided, the execution efficiency of congestion control is increased, and the production cost is reduced.

BRIEF DESCRIPTION OF THE DRAWINGS

The present disclosure will be further described in combination with the drawings and embodiments below.

DETAILED DESCRIPTION OF THE EMBODIMENTS

It is to be understood that, the exemplary embodiments described herein are only used to explain the present disclosure and are not used to limit the present disclosure.

In the subsequent description, suffixes such as "module", "part" or "unit" used to represent elements are used only to facilitate the description of the embodiments of the present disclosure without exerting specific limitations. Therefore, "module", "part" or "unit" can be used in a mixed manner.

First Embodiment

Figure 1:
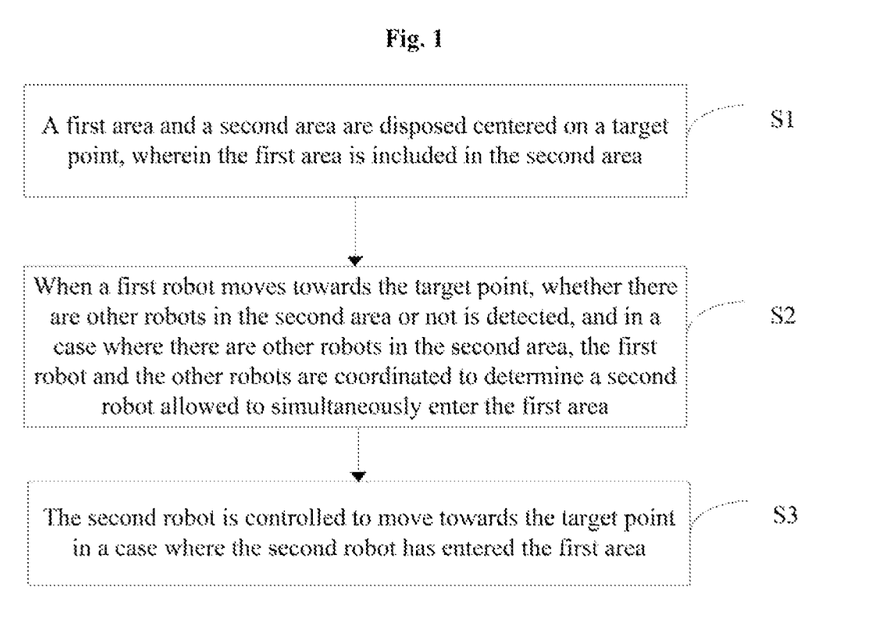
FIG. 1 is a flowchart of a first embodiment of a distributed congestion control method of the present disclosure.

FIG. 1 is a flowchart of a first embodiment of a distributed congestion control method of the present disclosure. A distributed congestion control method includes operations S1 to S3 which are described in detail as follows.

At S1, a first area and a second area are disposed centered on a target point, wherein the first area is included in the second area.

At S2, when a first robot moves towards the target point, whether there are other robots in the second area or not is detected, and in a case where there are other robots in the second area, the first robot and the other robots are coordinated to determine a second robot allowed to simultaneously enter the first area.

At S3, the second robot is controlled to move towards the target point in a case where the second robot has entered the first area.

In this embodiment, firstly, the first area and the second area are disposed centered on the target point, wherein the first area is included in the second area. It should be noted that, this embodiment may adaptively provide a robot individual based and independent distributed congestion management scheme for the shortcomings of a centralized congestion management scheme. Specifically, firstly, the target point of a robot in the process of executing a task is determined, and the target point may be the common target point of a plurality of robots in the same area, or the common point that the plurality of robots may pass through in the process of executing the task. It can be understood that, the target point does not only refer to an execution point of the task, but also includes a coincidence or intersection point in the paths of the plurality of robots, and possible congestion may occur in the vicinity of these points. Therefore, this embodiment takes this point as the target point for subsequent description. In this embodiment, after determining any target point through which the plurality of robots may pass at the same time or at which the plurality of robots may stay at the same time, the first area and the second area are disposed centered on the target point, the first area is included in the second area, and the area range and area shape of the first area and the second area are not specifically limited. In this embodiment, the first area is included in the second area, or there are a plurality of first areas included in the same second area.

In this embodiment, when the first robot moves towards the target point, whether there are other robots in the second area or not is detected, and in a case where there are other robots in the second area, the first robot and the other robots are coordinated to determine the second robot allowed to simultaneously enter the first area. It should be noted that, in order to realize robot distributed congestion control, in this embodiment, an independent state machine may be set for each robot, the position of the robot may be determined through the state machine, and other robots adjacent to the robot may be sensed through the state machine, so that the motion strategy planning of obstacle avoidance and congestion prevention may be performed according to the above information. In some exemplary implementations of this embodiment, instead of using a central processing unit to calculate the trajectory for each robot, the robot may independently determine the optimal motion strategy in combination with its own target point information and surrounding neighbor information, so as to avoid congestion, reduce the risk of collision between robots and improve the cooperation efficiency. For example, each robot may use a state machine, and a plurality of robots are coordinated to achieve the same behavior. For example, in the actual operation scenario, some robots may choose to wait to avoid interference with other robots. Therefore, the number of robots going to the same target point at the same time can be reduced, which can reduce the probability of congestion. However, it should be noted that, this scheme does not completely prohibit a plurality of robots from going to the same target point at the same time, instead, the number of robots going to the same target point at the same time is reduced, that is, when the number of robots in the target area is reduced, the robot collision probability can be greatly reduced. At last, when the second robot has entered the first area, in order to improve the execution efficiency, the second robot is directly controlled to move towards the target point without waiting or suspending.

This embodiment has the beneficial effects that: the first area and the second area are disposed centered on the target point, wherein the first area is included in the second area. When the first robot moves towards the target point, whether there are other robots in the second area or not is detected, in a case where there are other robots in the second area, the first robot and the other robots are coordinated to determine the second robot allowed to simultaneously enter the first area. Finally, the second robot is controlled to move towards the target point in a case where the second robot has entered the first area. A more efficient distributed congestion control scheme is implemented, so that the robot can independently perform anti-congestion control according to the position of the robot and the states of adjacent robots in the process of task execution, the problems of system instability and relatively high resource occupation caused by centralized congestion control are avoided, the execution efficiency of congestion control is increased, and the production cost is reduced.

Second Embodiment

Figure 2:
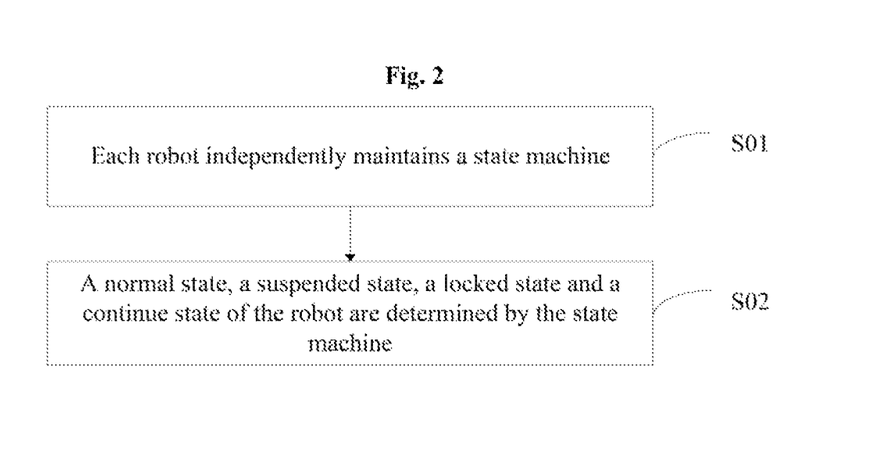
FIG. 2 is a flowchart of a second embodiment of a distributed congestion control method of the present disclosure.

FIG. 2 is a flowchart of a second embodiment of a distributed congestion control method of the present disclosure. On the basis of the above embodiment, before the operation that the first area and the second area are disposed centered on the target point, wherein the first area is included in the second area, the method includes operations S01 and S02 which are described in detail below.

At S01, each robot independently maintains a state machine.

At S02, a normal state, a suspended state, a locked state and a continue state of the robot are determined by the state machine.

Figure 9:
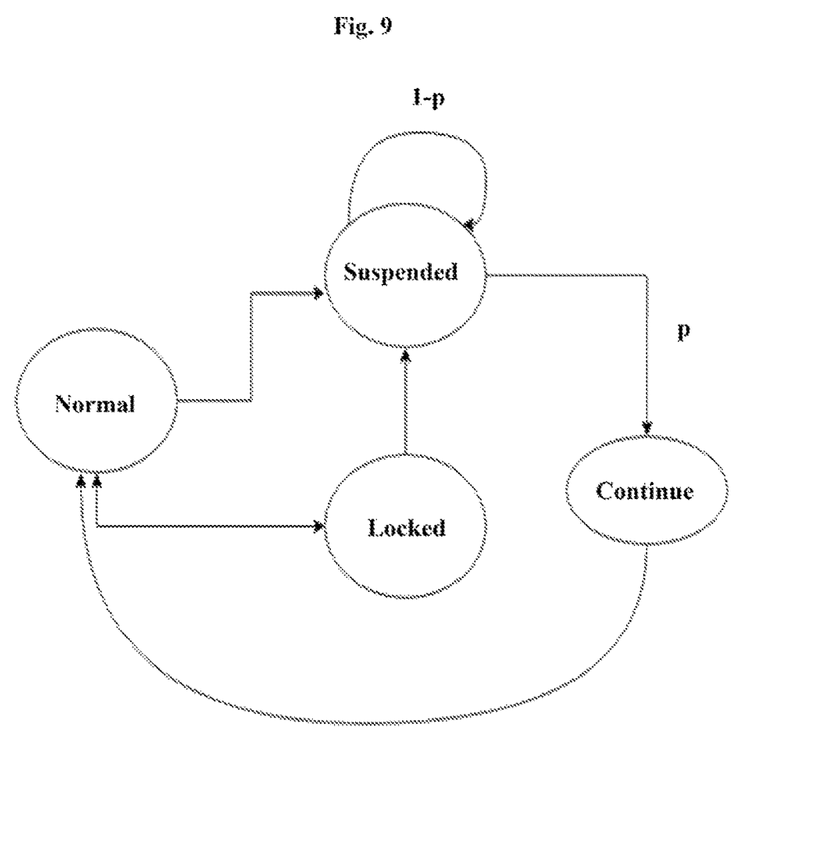
FIG. 9 is a schematic diagram of a state machine of a distributed congestion control method of the embodiment of the present disclosure.

In this embodiment, FIG. 9 is a schematic diagram of a state machine of a distributed congestion control method of the embodiment of the present disclosure. Each robot independently maintains a state machine, and the normal state, the suspended state, the locked state and the continue state of the robot are determined by the state machine.

In at least one exemplary implementation of the embodiment, each robot may be switched from the normal state to the suspended state, or the robot may be switched back to the normal state after switching.

In at least one exemplary implementation of the embodiment, each robot may be switched from the suspended state to the continue state, or the robot may be switched back to the suspended state after switching.

In at least one exemplary implementation of the embodiment, each robot may be switched from the continue state to the normal state, or the robot may be switched back to the continue state after switching.

In at least one exemplary implementation of the embodiment, each robot may be switched from the normal state to the locked state, or the robot may be switched back to the normal state after switching.

In at least one exemplary implementation of the embodiment, each robot may be switched from the locked state to the suspended state, or the robot may be switched back to the locked state after switching.

In at least one exemplary embodiment, there is a probability p for each robot to switch from the suspended state to the continue state, and there is a probability (1-p) for each robot to maintain the suspended state.

This embodiment has the beneficial effects that: each robot independently maintains a state machine, and the normal state, the suspended state, the locked state and the continue state of the robot are determined by the state machine. The embodiment provides the setting basis of the state machine for realizing a more efficient distributed congestion control scheme, so that the robot can independently perform anti-congestion control according to the position of the robot and the states of adjacent robots in the process of task execution, the problems of system instability and relatively high resource occupation caused by centralized congestion control are avoided, the execution efficiency of congestion control is increased, and the production cost is reduced.

Third Embodiment

Figure 3:
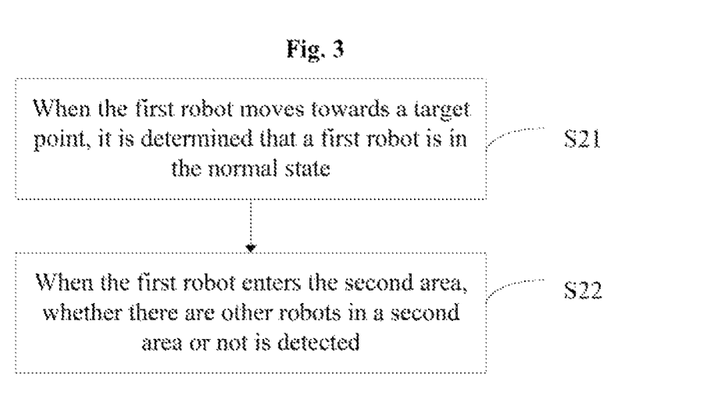
FIG. 3 is a flowchart of a third embodiment of a distributed congestion control method of the present disclosure.

FIG. 3 is a flowchart of a third embodiment of a distributed congestion control method of the present disclosure. On the basis of the above embodiment, the operation that whether there are other robots in the second area or not is detected when the first robot moves towards the target point, and in a case where there are other robots in the second area, the first robot and the other robots are coordinated to determine the second robot allowed to simultaneously enter the first area includes operations S21 and S22 which are described in detail as follows.

At S21, when the first robot moves towards the target point, it is determined that the first robot is in the normal state.

At S22, when the first robot enters the second area, whether there are other robots in the second area or not is detected.

In this embodiment, firstly, when the first robot moves towards the target point, it is determined that the first robot is in the normal state, and when the first robot enters the second area, whether there are other robots in the second area or not is detected.

In at least one exemplary implementation of the embodiment, when the first robot moves towards the target point, it is determined that the first robot is in the normal state, and the first robot refers to any one or more robots moving towards the same target point.

In at least one exemplary implementation of the embodiment, whether there are other robots in the second area or not is detected when the first robot enters the second area, and whether there are other robots in the second area or not is detected through a distance sensing assembly of the first robot.

Figure 10:
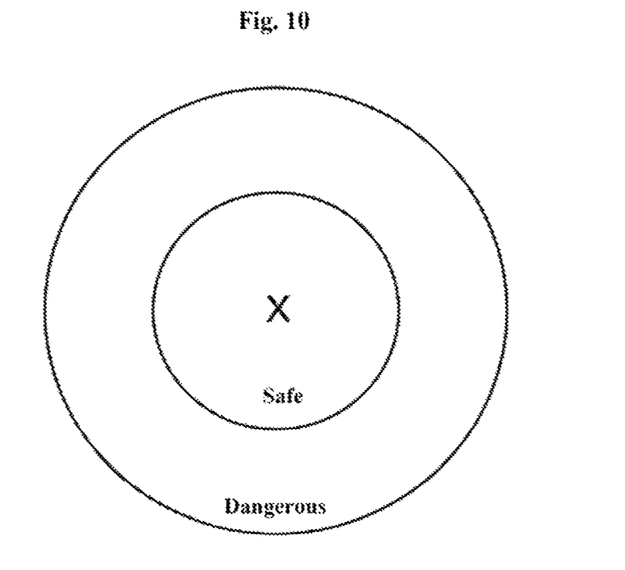
FIG. 10 is a schematic diagram of area division of a distributed congestion control method of the embodiment of the present disclosure.

FIG. 10 is a schematic diagram of area division of a distributed congestion control method of the embodiment of the present disclosure. In at least one exemplary implementation of the embodiment, the first area is included in the second area, the first area and the second area may be concentric circular areas centered on the above target point. Since the first area is closer to the target point indicated by X than the second area, in this embodiment, the first area may also be used as a safety area, and the second area may be used as a dangerous area.

This embodiment has the beneficial effects that: when identifying that the first robot moves towards the target point, it is determined that the first robot is in the normal state, and when the first robot enters the second area, whether there are other robots in the second area or not is detected. The embodiment provides the setting basis of two related areas for realizing a more efficient distributed congestion control scheme, so that the robot can independently perform anti-congestion control according to the position of the robot and the states of adjacent robots in the process of task execution, the problems of system instability and relatively high resource occupation caused by centralized congestion control are avoided, the execution efficiency of congestion control is increased, and the production cost is reduced.

Fourth Embodiment

Figure 4:
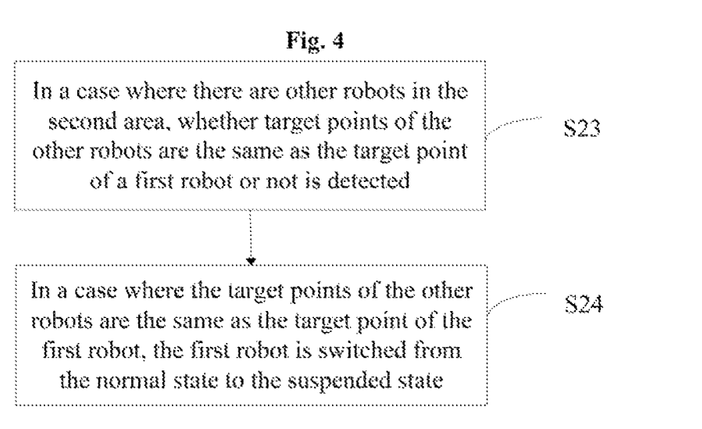
FIG. 4 is a flowchart of a fourth embodiment of a distributed congestion control method of the present disclosure.

FIG. 4 is a flowchart of a fourth embodiment of a distributed congestion control method of the present disclosure. On the basis of the above embodiment, the operation that whether there are other robots in the second area or not is detected when the first robot moves towards the target point, and in a case where there are other robots in the second area, the first robot and the other robots are coordinated to determine the second robot allowed to simultaneously enter the first area further includes operations S23 and S24 which are described in detail below.

At S23, in the case where there are other robots in the second area, whether target points of the other robots are the same as the target point of the first robot or not is detected.

At S24, in a case where the target points of the other robots are the same as the target point of the first robot, the first robot is switched from the normal state to the suspended state.

In this embodiment, in the case where there are other robots in the second area, whether target points of the other robots are the same as the target point of the first robot or not is detected, and in a case where the target points of the other robots are the same as the target point of the first robot, the first robot is switched from the normal state to the suspended state.

In at least one exemplary implementation of the embodiment, as mentioned above, since the first area is closer to the target point indicated by X than the second area, in this embodiment, the first area may also be used as a safety area, and the second area may be used as a dangerous area. Moreover, the safety area and dangerous area may be any one of a circular area, a square area and an irregular area.

In at least one exemplary implementation of the embodiment, in the above different area forms, the position of the first robot in the second area is determined, and whether target points of the other robots are the same as the target point of the first robot or not is detected based on the position and the area forms.

In at least one exemplary implementation of the embodiment, in a case where the target points of the other robots are the same as the target point of the first robot, the first robot is switched from the normal state to the suspended state, that is, when detecting the possibility of congestion, the moving state of the robot is switched to the suspended state.

This embodiment has the beneficial effects that: in the case where there are other robots in the second area, whether target points of the other robots are the same as the target point of the first robot or not is detected, and in a case where the target points of the other robots are the same as the target point of the first robot, the first robot is switched from the normal state to the suspended state.

The embodiment provides a detection processing scheme of a dangerous area for realizing a more efficient distributed congestion control scheme, so that the robot can independently perform anti-congestion control according to the position of the robot and the states of adjacent robots in the process of task execution, the problems of system instability and relatively high resource occupation caused by centralized congestion control are avoided, the execution efficiency of congestion control is increased, and the production cost is reduced.

Fourth Embodiment

Figure 5:
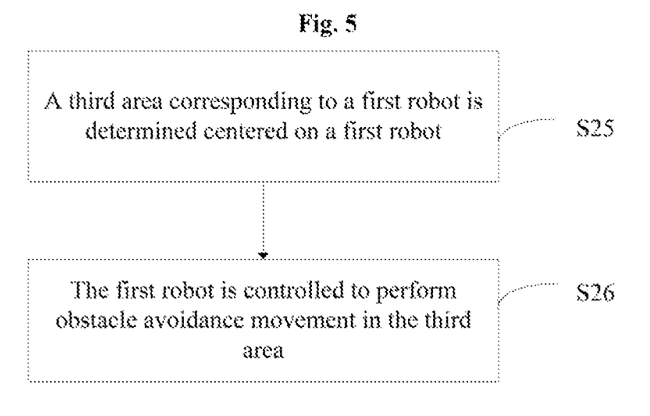
FIG. 5 is a flowchart of a fifth embodiment of a distributed congestion control method of the present disclosure.

FIG. 5 is a flowchart of a fifth embodiment of a distributed congestion control method of the present disclosure. On the basis of the above embodiment, the operation that whether there are other robots in the second area or not is detected when the first robot moves towards the target point, and in a case where there are other robots in the second area, the first robot and the other robots are coordinated to determine the second robot allowed to simultaneously enter the first area further includes operations S25 and S26 which are described in detail below.

At S25, a third area corresponding to the first robot is determined centered on the first robot.

At S26, the first robot is controlled to perform obstacle avoidance movement in the third area.

In this embodiment, a third area corresponding to the tint robot is determined centered on the first robot, and the first robot is controlled to perform obstacle avoidance movement in the third area.

In at least one exemplary implementation of the embodiment, as mentioned above, in the case where a robot in the suspended state remains absolutely stationary, this robot may interfere with the movement of other robots. Therefore, in this embodiment, a relatively small third area which is centered on the suspended robot may be set for the robot in the suspended state, that is, in this third area, the robot is allowed to avoid obstacles in a small range, so as to avoid interference to the movement of other robots.

In at least one exemplary implementation of the embodiment, when a robot j in the normal state moves towards the target point, the following control strategy may be adopted:

$$u_j = a \cdot t_j - b \cdot \sum_{i \in N_j} r(i, j),$$

where uj represents a control output of a control to the robot j, a and b are constants greater than 0, tj is a function that drives the robot to move towards the target point, Nj represents all neighbors of the robot j, and r(i, j) is a repulsion function that drives the robot j away from other robots.

This embodiment has the beneficial effects that: the third area corresponding to the first robot is determined centered on the first robot, and the first robot is controlled to perform obstacle avoidance movement in the third area. The embodiment provides an obstacle avoidance processing scheme of a dangerous area for realizing a more efficient distributed congestion control scheme, so that the robot can independently perform anti-congestion control according to the position of the robot and the states of adjacent robots in the process of task execution, the problems of system instability and relatively high resource occupation caused by centralized congestion control are avoided, the execution efficiency of congestion control is increased, and the production cost is reduced.

Sixth Embodiment

Figure 6:
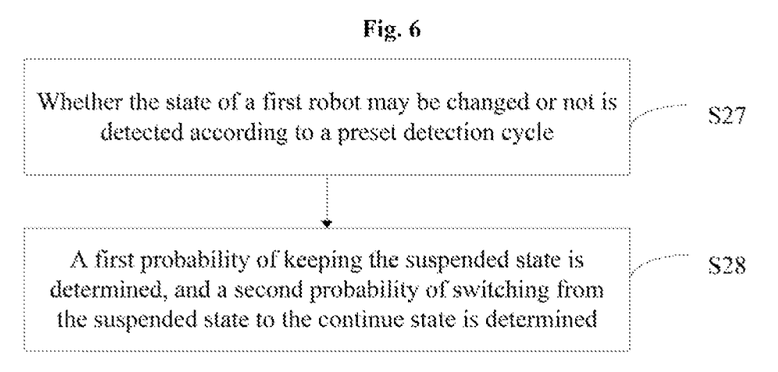
FIG. 6 is a flowchart of a sixth embodiment of a distributed congestion control method of the present disclosure.

FIG. 6 is a flowchart of a sixth embodiment of a distributed congestion control method of the present disclosure. On the basis of the above embodiment, the operation that whether there are other robots in the second area or not is detected when the first robot moves towards the target point, and in a case where there are other robots in the second area, the first robot and the other robots are coordinated to determine the second robot allowed to simultaneously enter the first area further includes operations S27 and S28 which are described in detail below.

At S27, whether a state of the first robot is able to be changed or not is detected according to a preset detection cycle.

At S28, a first probability of keeping the suspended state is determined, and a second probability of switching from the suspended state to the continue state is determined.

In this embodiment, whether a state of the first robot is able to be changed or not is detected according to the preset detection cycle, a first probability of keeping the suspended state is determined, and a second probability of switching from the suspended state to the continue state is determined.

In at least one exemplary implementation of the embodiment, it also should be noted that, on the basis of the above embodiment, when a robot j in the normal state enters a dangerous area, the robot may use its own sensor data (e.g., laser sensor, visual sensor, etc.) to detect whether there are other robots in front of the robot. In the case where there are other robots and the target points of the other robots are the same as the target point of the robot, the robot may perform state transformation, that is, the current state is changed to a suspended state.

In this embodiment, for a robot in the suspended state, the robot may perform small-scale obstacle avoidance while keeping still as much as possible, and the obstacle avoidance has a higher priority than keeping still. Therefore, a controlling equation at this time takes the following form:

$$u_j = 0 \cdot t_j - b_1 \cdot \sum_{i \in N_j} r(i, j) + b_2 \cdot \frac{w_j - q_j}{\|w_j - q_j\|},$$

where b1>b2>0 are constants, qj is the current position of the robot j, and wj is the position where the robot j is switched to the suspended state.

In at least one exemplary implementation of the embodiment, whether a state of the first robot is able to be changed or not is detected according to the preset detection cycle, a first probability (1-p) of keeping the suspended state is determined, and a second probability pot switching from the suspended state to the continue state is determined.

This embodiment has the beneficial effects that: whether a state of the first robot is able to be changed or not is detected according to the preset detection cycle, and then a first probability of keeping the suspended state is determined, and a second probability of switching from the suspended state to the continue state is determined. The embodiment provides a scheme for switching control between a suspended state and a continue state for realizing a more efficient distributed congestion control scheme, so that the robot can independently perform anti-congestion control according to the position of the robot and the states of adjacent robots in the process of task execution, the problems of system instability and relatively high resource occupation caused by centralized congestion control are avoided, the execution efficiency of congestion control is increased, and the production cost is reduced.

Seventh Embodiment

Figure 7:
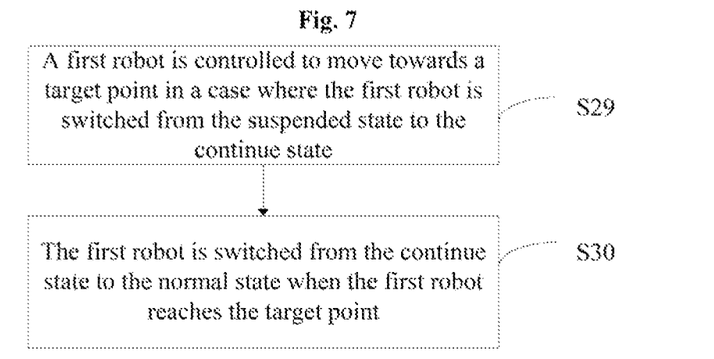
FIG. 7 is a flowchart of a seventh embodiment of a distributed congestion control method of the present disclosure.

FIG. 7 is a flowchart of a seventh embodiment of a distributed congestion control method of the present disclosure. On the basis of the above embodiment, the operation that whether there are other robots in the second area or not is detected when the first robot moves towards the target point, and in a case where there are other robots in the second area, the first robot and the other robots are coordinated to determine the second robot allowed to simultaneously enter the first area further includes operations S29 and S30.

At S29, the first robot is controlled to move, towards the target point in a case where the first robot is switched from the suspended state to the continue state.

At S30, the first robot is switched from the continue state to the normal state when the first robot reaches the target point.

In this embodiment, the first robot is controlled to move towards the target point in a case where the first robot is switched from the suspended state to the continue state, and then the first robot is switched from the continue state to the normal state when the first robot reaches the target point.

In at least one exemplary implementation of the embodiment, in order to improve the task execution efficiency and avoid additional congestion, when the robot in the continue state moves towards the target point, the robot will not be stopped and will remain in the moving state until the robot reaches the target point.

In at least one exemplary implementation of the embodiment, when the robot moves towards the target point and reaches the target point, the state of the robot may be switched to the normal state.

This embodiment has the beneficial effects that: the first robot is controlled to move towards the target point in a case where the first robot is switched from the suspended state to the continue state, and then the first robot is switched from the continue state to the normal state when the first robot reaches the target point. The embodiment provides a switching control scheme of a normal state for realizing a more efficient distributed congestion control scheme, so that the robot can independently perform anti-congestion control according to the position of the robot and the states of adjacent robots in the process of task execution, the problems of system instability and relatively high resource occupation caused by centralized congestion control are avoided, the execution efficiency of congestion control is increased, and the production cost is reduced.

Eighth Embodiment

Figure 8:
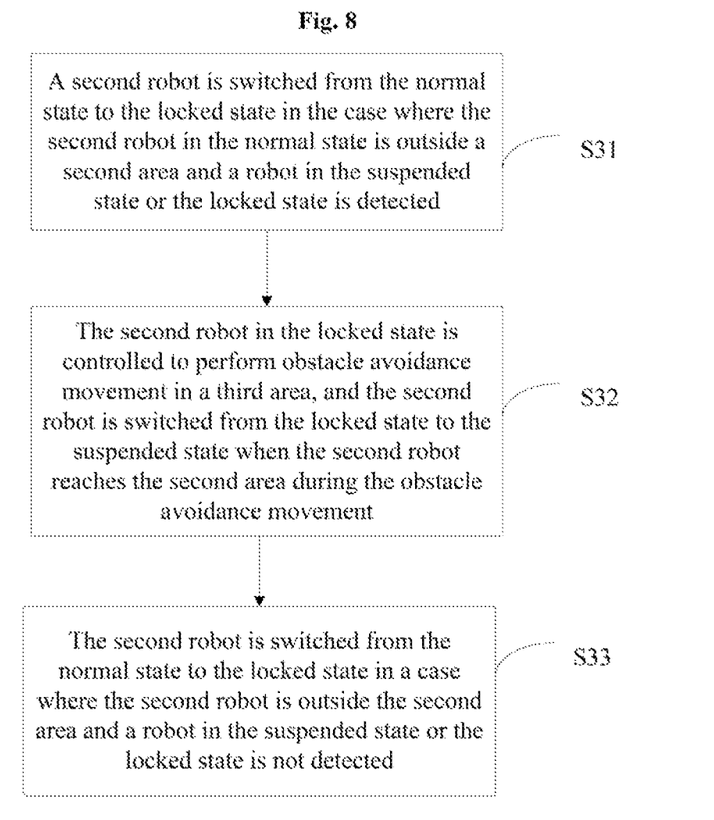
FIG. 8 is a flowchart of an eighth embodiment of a distributed congestion control method of the present disclosure.

FIG. 8 is a flowchart of an eighth embodiment of a distributed congestion control method of the present disclosure. On the basis of the above embodiment, after the operation that whether there are other robots in the second area or not is detected when the first robot moves towards the target point, and in a case where there are other robots in the second area, the first robot and the other robots are coordinated to determine the second robot allowed to simultaneously enter the first area, the method includes operations S31 to S33 which are described in detail below.

At S31, the second robot is switched from the normal state to the locked state in a case where the second robot in the normal state is outside the second area and a robot in the suspended state or the locked state is detected.

At S32, the second robot in the locked state is controlled to perform obstacle avoidance movement in the third area, and the second robot is switched from the locked state to the suspended state when the second robot reaches the second area during the obstacle avoidance movement.

At S33, the second robot is switched from the normal state to the locked state in a case where the second robot is outside the second area and a robot in the suspended state or the locked state is not detected.

In this embodiment, firstly, in a case where the second robot in the normal state is outside the second area and a robot in the suspended state or the locked state is detected, the second robot is switched from the normal state to the locked state. Then, the second robot in the locked state is controlled to perform obstacle avoidance movement in the third area, and when the second robot reaches the second area during the obstacle avoidance movement, the second robot is switched from the locked state to the suspended state. Finally, when the second robot is outside the second area and a robot in the suspended state or the locked state is not detected, the second robot is switched from the locked state to the normal state.

In at least one exemplary implementation of the embodiment, in order to avoid excessive congestion control, when a robot in the normal state is outside a dangerous area, in the case where a robot in the suspended state or the locked state is detected, the robot may be switched to the locked state.

In at least one exemplary implementation of the embodiment, when a normal robot is outside the dangerous area, and there is a robot in the locked state, the robot, like other robots in the suspended state, does not move towards the target point, so as to avoid further congestion.

In at least one exemplary implementation of the embodiment, when a robot in the normal state is outside the dangerous area and other robots in the suspended state or the locked state are not detected, it is determined that the robot can continue to move. Therefore, the state of the robot is switched back to the normal state.

In at least one exemplary implementation of the embodiment, when a robot in the normal state is outside the dangerous area and there is a robot in the locked state, in the case where the robot moves towards the dangerous area due to obstacle avoidance operation, in order to avoid the possible congestion caused by subsequent obstacle avoidance, the state of the robot is switched to the suspended state.

This embodiment has the beneficial effects that: in a case where the second robot in the normal state is outside the second area and a robot in the suspended state or the locked state is detected, the second robot is switched from the normal state to the locked state. Then, the second robot in the locked state is controlled to perform obstacle avoidance movement in the third area, and when the second robot reaches the second area during the obstacle avoidance movement, the second robot is switched from the locked state to the suspended state. Finally, when the second robot is outside the second area and a robot in the suspended state or the locked state is not detected, the second robot is switched from the locked state to the normal state. The embodiment provides a switching control scheme outside a dangerous area for realizing a more efficient distributed congestion control scheme, so that the robot can independently perform anti-congestion control according to the position of the robot and the states of adjacent robots in the process of task execution, the problems of system instability and relatively high resource occupation caused by centralized congestion control are avoided, the execution efficiency of congestion control is increased, and the production cost is reduced.

Ninth Embodiment

On the basis of the above embodiment, the present disclosure provides a robot. The robot is capable of performing autonomous obstacle avoidance control among a plurality of robots. The robot is configured to perform moving tasks under distributed congestion control. The robot includes a mobile base, a sensing assembly and a processor.

The mobile base is configured to drive a robot to independently navigate to a target point of a task to be executed.

The sensing assembly determines whether there are other robots in an adjacent area of the robot or not through distance detection.

The processor is configured to perform distributed congestion control to control the robot to reach the target point.

A first area and a second area are disposed centered on the target point. The first area is included in the second area.

When a first robot moves towards the target point, whether there are other robots in the second area or not is detected. In a case where there are other robots in the second area, the first robot and the other robots are coordinated to determine a second robot allowed to simultaneously enter the first area.

The second robot is controlled to move towards the target point in a case where the second robot has entered the first area.

It is to be noted that, the above robot embodiment and method embodiment belong to the same concept, and the exemplary implementation process is detailed in the method embodiment, and the technical features in the method embodiment are applicable in the robot embodiment, which will not be elaborated here.

Tenth Embodiment

On the basis of the above embodiment, the present disclosure provides a computer-readable storage medium. A distributed congestion control program is stored on the computer-readable storage medium. When the distributed congestion control program is executed by a processor, the operations of the distributed congestion control method as described in any one of the above embodiments are performed.

It is to be noted that, the above medium embodiment and method embodiment belong to the same concept, and the exemplary implementation process is detailed in the method embodiment, and the technical features in the method embodiment are applicable in the medium embodiment, which may not be elaborated here.

It is to be noted that, herein, terms "include" and "contain" or any other variants thereof are intended to cover nonexclusive inclusions, so that, a process, a method, or an apparatus including a series of elements not only includes those elements but also includes other elements which are not clearly listed or further includes intrinsic elements of the process, the method or the apparatus. Under the condition of no more limitations, an element defined by a statement "including a/an . . . " does not exclude existence of additional same elements in the process, the method, or the apparatus.

The above serial number of the embodiment of the present disclosure is only for description and does not represent the advantages and disadvantages of the embodiments.

Through the description of the above embodiments, those having ordinary skill in the art can clearly understand that the above embodiment method can be realized by means of software and necessary general hardware platforms. Of course, the above embodiment method can also be realized by hardware, but in many cases, the former is a better implementation. Based on this understanding, the technical solution of the embodiments of the present disclosure essentially or the part that contributes to the related art can be embodied in the form of a software product. The computer software product is stored in a storage medium (such as a ROM/RAM, a magnetic disc and a compact disc), including several commands to make a terminal (which may be a mobile phone, a computer, a server, an air conditioner, or a network device, etc.) to execute the method described in various embodiments of the present disclosure.

The embodiments of the present disclosure are described above in combination with the drawings, but the present disclosure is not limited to the above exemplary embodiments. The above exemplary embodiments are only schematic, not restrictive. Under the enlightenment of the present disclosure, those having ordinary skill in the art can also make many forms without departing from the scope protected by the purpose and claims of the present disclosure, which belong to the protection of the present disclosure.

What is claimed is:

1. A distributed congestion control method, comprising:
    disposing a first area and a second area centered on a target point, wherein the first area is comprised in the second area;
    detecting, when a first robot moves towards the target point, whether there are other robots in the second area or not, and in a case where there are other robots in the second area, coordinating the first robot and the other robots to determine a second robot allowed to simultaneously enter the first area; and
    controlling the second robot to move towards the target point in a case where the second robot has entered the first area.

2. The distributed congestion control method according to claim 1, before disposing the first area and the second area centered on the target point, wherein the first area is comprised in the second area, further comprising:
    independently maintaining a state machine by each robot; and
    determining a normal state, a suspended state, a locked state and a continue state of the robot by the state machine.

3. The distributed congestion control method according to claim 2, wherein detecting, when the first robot moves towards the target point, whether there are other robots in the second area or not, and in a case where there are other robots in the second area, coordinating the first robot and the other robots to determine the second robot allowed to simultaneously enter the first area comprises:
    determining, when the first robot moves towards the target point, that the first robot is in the normal state; and
    detecting, when the first robot enters the second area, whether there are other robots in the second area or not.

4. The distributed congestion control method according to claim 3, wherein detecting, when the first robot moves towards the target point, whether there are other robots in the second area or not, and in a case where there are other robots in the second area, coordinating the first robot and the other robots to determine the second robot allowed to simultaneously enter the first area further comprises:
    in the case where there are other robots in the second area, detecting whether target points of the other robots are the same as the target point of the first robot or not; and
    in a case where the target points of the other robots are the same as the target point of the first robot, switching the normal state of the first robot to the suspended state.

5. The distributed congestion control method according to claim 4, wherein detecting, when the first robot moves towards the target point, whether there are other robots in the second area or not, and in a case where there are other robots in the second area, coordinating the first robot and the other robots to determine the second robot allowed to simultaneously enter the first area further comprises:
- determining a third area corresponding to the first robot centered on the first robot; and
- controlling the first robot to perform obstacle avoidance movement in the third area.

6. The distributed congestion control method according to claim 5, wherein detecting, when the first robot moves towards the target point, whether there are other robots in the second area or not, and in a case where there are other robots in the second area, coordinating the first robot and the other robots to determine the second robot allowed to simultaneously enter the first area further comprises:
- detecting whether a state of the first robot is able to be changed or not according to a preset detection cycle; and
- determining a first probability of keeping the suspended state, and simultaneously determining a second probability of switching from the suspended state to the continue state.

7. The distributed congestion control method according to claim 6, wherein detecting, when the first robot moves towards the target point, whether there are other robots in the second area or not, and in a case where there are other robots in the second area, coordinating the first robot and the other robots to determine the second robot allowed to simultaneously enter the first area further comprises:
- controlling the first robot to move towards the target point in a case where the first robot is switched from the suspended state to the continue state; and
- switching the continue state of the first robot to the normal state when the first robot reaches the target point.

8. The distributed congestion control method according to claim 7, wherein after detecting, when the first robot moves towards the target point, whether there are other robots in the second area or not, and in a case where there are other robots in the second area, coordinating the first robot and the other robots to determine the second robot allowed to simultaneously enter the first area, the method further comprises:
- switching the second robot from the normal state to the locked state in a case where the second robot in the normal state is outside the second area and a robot in the suspended state or the locked state is detected;
- controlling the second robot in the locked state to perform obstacle avoidance movement in the third area, and switching the second robot from the locked state to the suspended state when the second robot reaches the second area during the obstacle avoidance movement; and
- switching the second robot from the normal state to the locked state in a case where the second robot is outside the second area and a robot in the suspended state or the locked state is not detected.

9. A non-transitory computer-readable storage medium, wherein a distributed congestion control program is stored on the non-transitory computer-readable storage medium, and when the distributed congestion control program is executed by a processor, the operations of the distributed congestion control method according to claim 8 are performed.

10. A non-transitory computer-readable storage medium, wherein a distributed congestion control program is stored on the non-transitory computer-readable storage medium, and when the distributed congestion control program is executed by a processor, the operations of the distributed congestion control method according to claim 7 are performed.

11. A non-transitory computer-readable storage medium, wherein a distributed congestion control program is stored on the non-transitory computer-readable storage medium, and when the distributed congestion control program is executed by a processor, the operations of the distributed congestion control method according to claim 6 are performed.

12. A non-transitory computer-readable storage medium, wherein a distributed congestion control program is stored on the non-transitory computer-readable storage medium, and when the distributed congestion control program is executed by a processor, the operations of the distributed congestion control method according to claim 5 are performed.

13. A non-transitory computer-readable storage medium, wherein a distributed congestion control program is stored on the non-transitory computer-readable storage medium, and when the distributed congestion control program is executed by a processor, the operations of the distributed congestion control method according to claim 4 are performed.

14. A non-transitory computer-readable storage medium, wherein a distributed congestion control program is stored on the non-transitory computer-readable storage medium, and when the distributed congestion control program is executed by a processor, the operations of the distributed congestion control method according to claim 3 are performed.

15. A non-transitory computer-readable storage medium, wherein a distributed congestion control program is stored on the non-transitory computer-readable storage medium, and when the distributed congestion control program is executed by a processor, the operations of the distributed congestion control method according to claim 2 are performed.

16. A non-transitory computer-readable storage medium, wherein a distributed congestion control program is stored on the non-transitory computer-readable storage medium, and when the distributed congestion control program is executed by a processor, the operations of the distributed congestion control method according to claim 1 are performed.

17. A robot, which is capable of performing autonomous obstacle avoidance control among a plurality of robots and is configured to perform moving tasks under distributed congestion control, wherein the robot comprises:
- a mobile base, configured to drive a robot to independently navigate to a target point of a task to be executed;
- a sensing assembly, configured to determine whether there are other robots in an adjacent area of the robot or not through distance detection; and
- a processor, configured to perform distributed congestion control to control the robot to reach the target point; dispose a first area and a second area centered on the target point, wherein the first area is comprised in the second area; detect, when a first robot moves towards the target point, whether there are other robots in the second area or not, and in a case where there are other robots in the second area, coordinate the first robot and the other robots to determine a second robot allowed to simultaneously enter the first area; and control the second robot to move towards the target point in a case where the second robot has entered the first area.

* * * * *